United States Patent [19]
Fujimoto et al.
[11] 4,115,787
[45] Sep. 19, 1978

[54] INTERPOLATION IN AN INK JET SYSTEM PRINTER

[75] Inventors: Isao Fujimoto, Kunitachi; Masahiko Aiba, Nara; Yoichi Yamamoto, Nara; Tomoo Makita, Nara, all of Japan

[73] Assignees: Nippon Telegraph and Telephone Public Corporation, Tokyo; Sharp Kabushiki Kaisha, Osaka, both of Japan

[21] Appl. No.: 604,798

[22] Filed: Aug. 14, 1975

[30] Foreign Application Priority Data

Aug. 16, 1974 [JP] Japan ................................ 49-94341

[51] Int. Cl.² ............................................ G01D 15/18
[52] U.S. Cl. ...................................... 346/75; 400/126
[58] Field of Search .................. 346/75; 340/324 AD; 197/1 R

[56] References Cited

U.S. PATENT DOCUMENTS

| | | | |
|---|---|---|---|
| 3,298,030 | 1/1967 | Lewis et al. | 346/75 |
| 3,418,518 | 12/1968 | Reese | 340/324 AD X |
| 3,725,900 | 4/1973 | Ohmann | 340/324 A |
| 3,774,161 | 11/1973 | Chambers | 340/324 AD X |
| 3,813,676 | 5/1974 | Wolfe | 346/75 |
| 3,911,818 | 10/1975 | MacIlvaine | 346/75 X |
| 3,959,797 | 5/1976 | Jensen | 346/75 X |
| 4,050,077 | 9/1977 | Yamada | 346/75 |

OTHER PUBLICATIONS

Videojet M9600 Printer Technical Description; A.B. Dick Co., Chicago, Ill.; 1971, pp. (2-1)-(2-5).

*Primary Examiner*—Joseph W. Hartary
*Attorney, Agent, or Firm*—Birch, Stewart, Kolasch and Birch

[57] ABSTRACT

In an ink jet system printer of the charge amplitude controlling type which records character patterns in, for example, a 5 × 7 dot matrix pattern, ink droplets not assigned to primary matrix dots are used for interpolation dots which will be deposited between two adjacent primary matrix dots on a record receiving member. The printing quality can be enhanced by provision of these interpolation dots.

6 Claims, 11 Drawing Figures

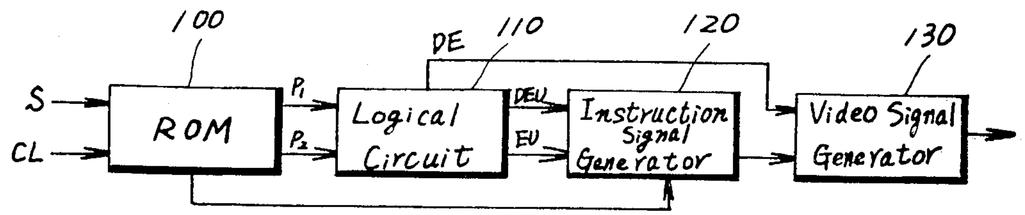
FIG. 4
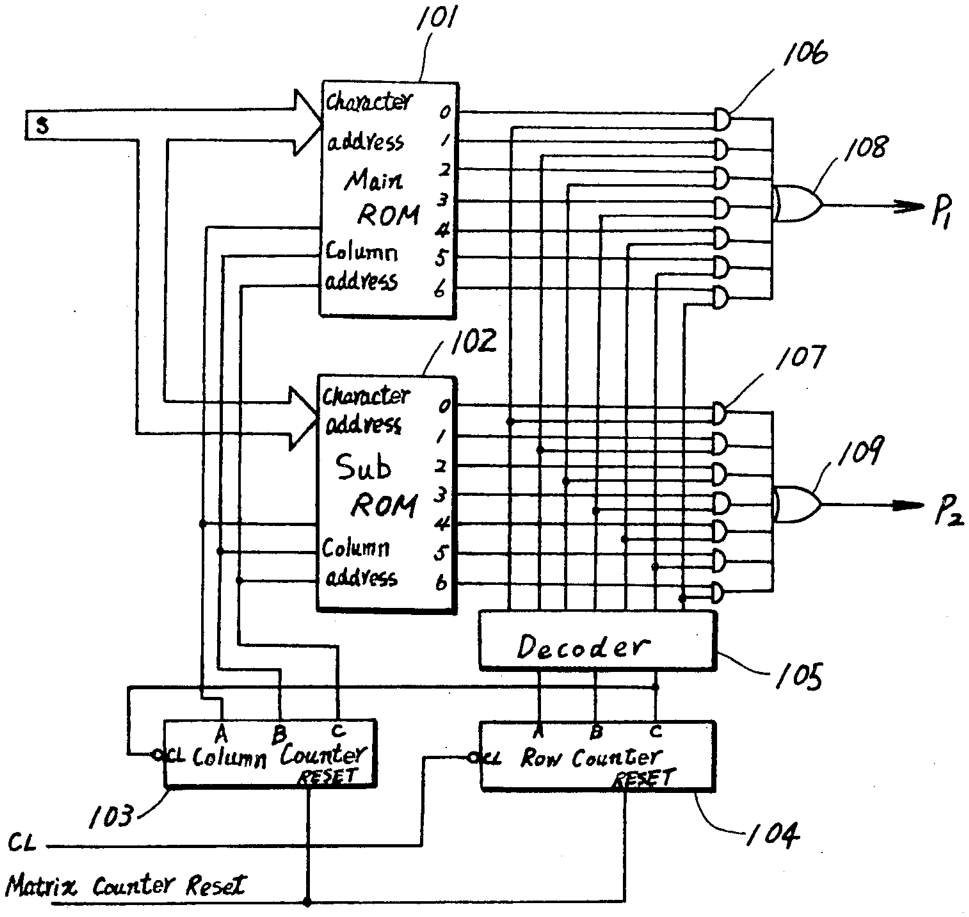
FIG. 5 (Read Only Memory -100-)

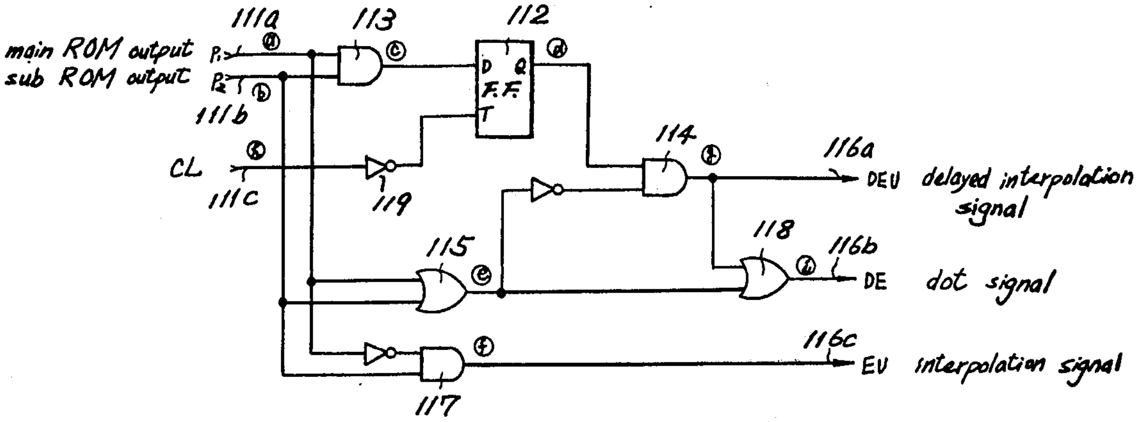
FIG. 6 (Logical Circuit -110-)
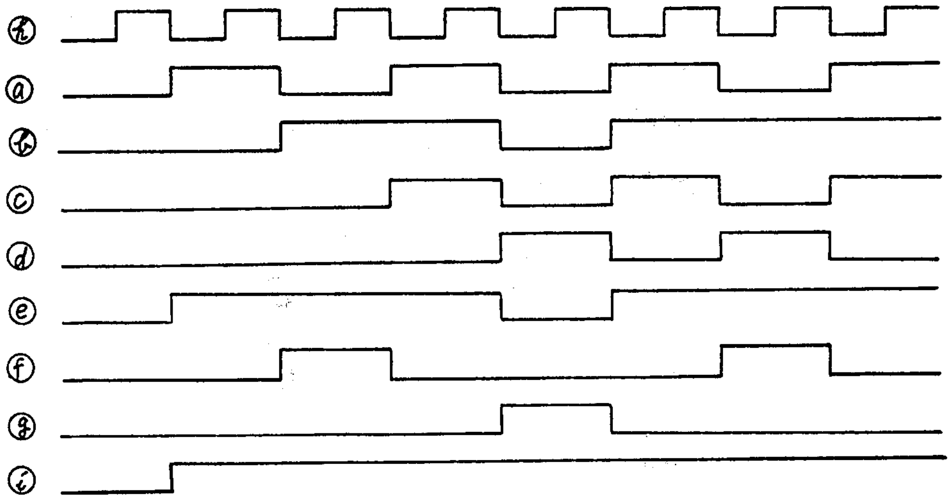
FIG. 7

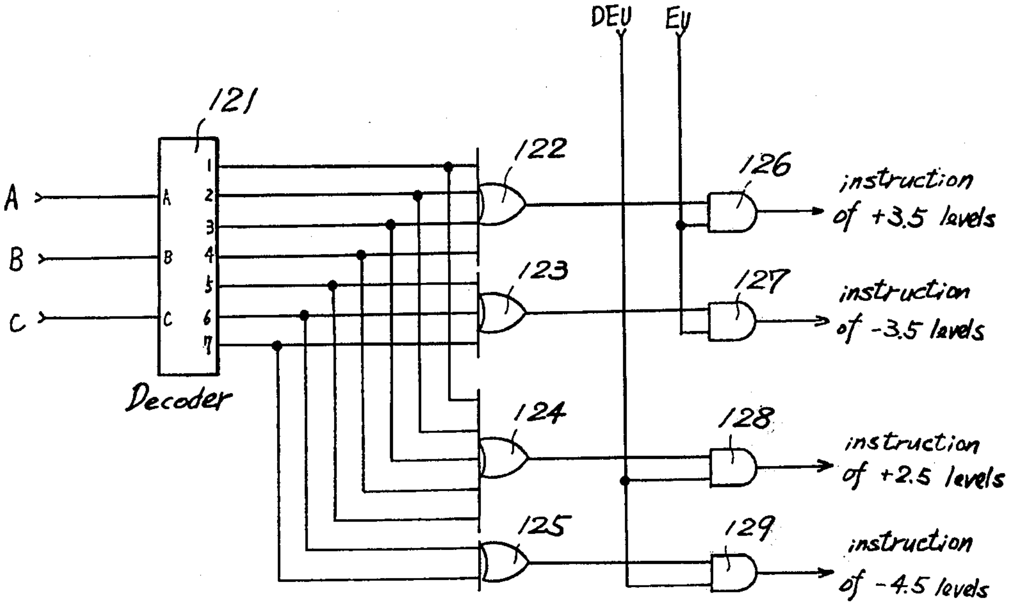
FIG. 10 (Instruction Signal Generator -120-)

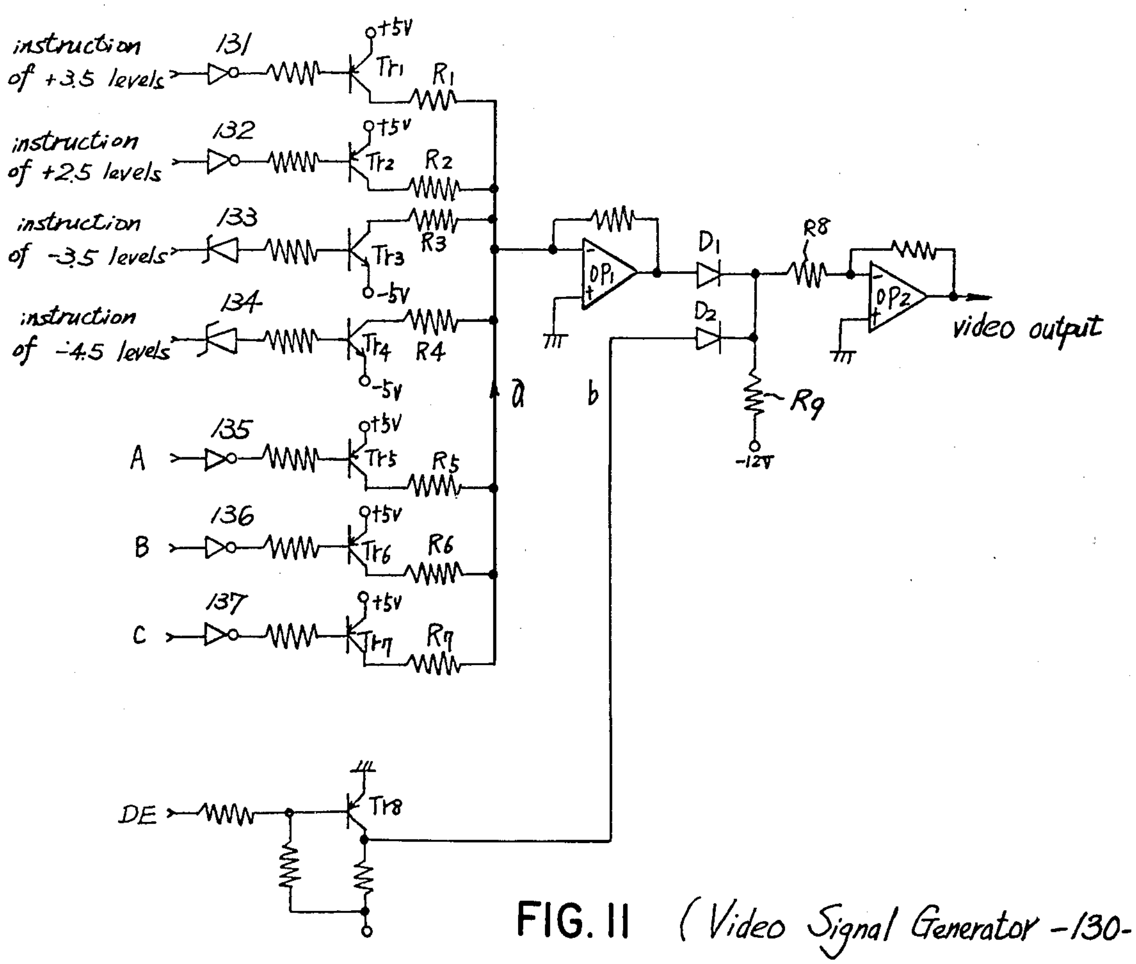
FIG. 11 (Video Signal Generator -130-

INTERPOLATION IN AN INK JET SYSTEM PRINTER

BACKGROUND AND SUMMARY OF THE INVENTION

The present invention relates to an ink jet system printer of the charge amplitude controlling type and, more particularly, to a video signal generator of an ink jet system printer of the charge amplitude controlling type.

A typical circuit construction of an ink jet system printer of the charge amplitude controlling type is disclosed in Takeshi Kasubuchi, Yuji Sumitomo and Masahiko Aiba U.S. Pat. No. 3,878,517 "INK JET SYSTEM OF CHARGE AMPLITUDE CONTROLLING TYPE" patented on Apr. 15, 1975.

In an ink jet system printer, it is a great importance to speed up the printing velocity and to enhance the printing quality. It is not preferable to increase the necessary number of ink droplets to form a dot matrix pattern in order to enhance the printing quality, because the printing velocity will unavoidably slow down.

In general, more than half of ink droplets propelled from the nozzle serve no function of printing and these droplets are collected and returned to the nozzle after they impinge upon a screen as is well known in the art. It is very effective to use these droplets serving no function of printing for enhancing the printing quality.

Accordingly, an object of the present invention is to enhance the printing quality in an ink jet system printer of the charge amplitude controlling type without decreasing the printing velocity.

Another object of the present invention is to provide a video signal generator useful for enhancing the printing quality in an ink jet system printer of the charge amplitude controlling type.

Still another object of the present invention is to provide interpolation dots which will be deposited between two adjacent primary matrix dots on a record receiving member with the use of ink droplets serving no function of printing.

Other objects and further scope of applicability of the present invention will become apparent from the detailed description given hereinafter. It should be understood, however, that the detailed description and specific examples, while indicating preferred embodiments of the invention, are given by way of illustration only, since various changes and modification within the spirit and scope of the invention will become apparent to those skilled in the art from this detailed description.

BRIEF DESCRIPTION OF THE DRAWINGS

FIG. 4 is a block diagram of a control circuit of the present invention including a read only memory, a logical circuit, an instruction signal generator, and a video signal generator;

FIG. 5 is a block diagram of the read only memory included within the control circuit of FIG. 4;

FIG. 6 is a block diagram of the logical circuit included within the control circuit of FIG. 4;

FIG. 7 is a time chart showing wave forms of signals occurring within the logical circuit of FIG. 6;

FIG. 10 is a block diagram of the instruction signal generator included within the control circuit of FIG. 4; and FIG. 11 is a circuit diagram of the video signal generator included within the control circuit of FIG. 4.

DESCRIPTION OF THE PREFERRED EMBODIMENTS

Figure 1:
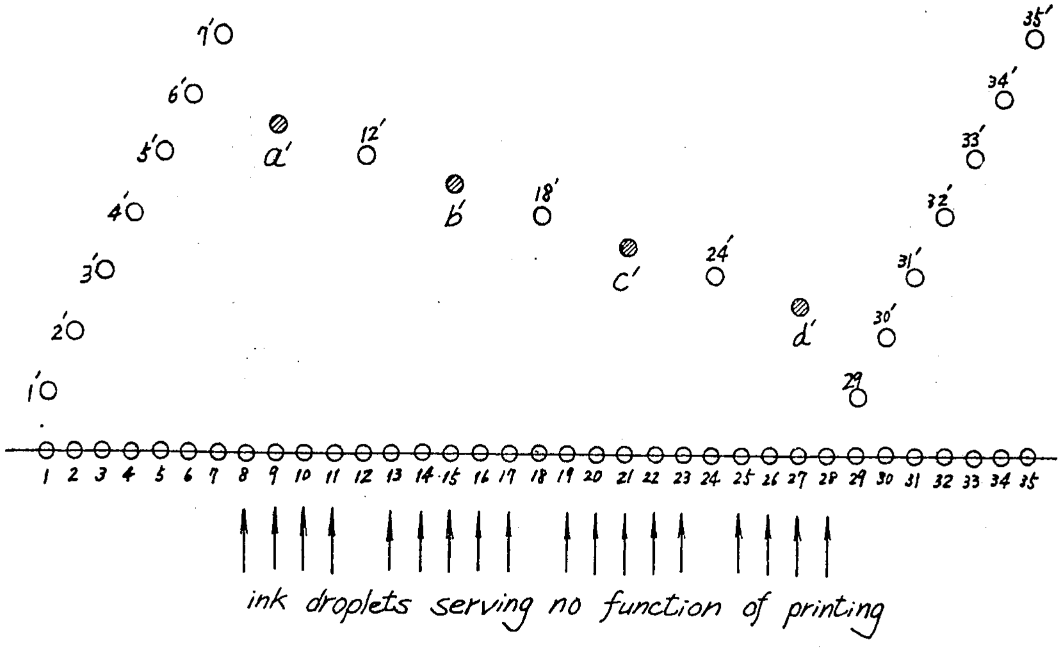
FIG. 1 is a schematic view showing a relationship between a character pattern and ink droplet formation timing.

Referring now to FIG. 1, there is illustrated a relationship between a character pattern and ink droplet formation timing. A character "N" is printed by way of an example in a 5 × 7 dot matrix pattern.

A typical construction of an ink jet system printer of the charge amplitude controlling type is shown in, for example, Takeshi Kasubuchi, Yuji Sumitomo and Masahiko Aiba U.S. Pat. No. 3,878,517 "INK JET SYSTEM OF CHARGE AMPLITUDE CONTROLLING TYPE" patented on Apr. 15, 1975. Therefore, this construction has been omitted from this detailed description for the purpose of simplicity.

It will be clear from FIG. 1 that a character pattern is assigned 35 ink droplets to form a 5 × 7 dot matrix pattern. Respective groups of droplets consisting of 7 droplets are adapted to form respective columns in a dot matrix pattern and adapted to receive graded charging signals of seven levels. A control circuit is provided to select desired ink droplets to be charged by the charging signals in order to record desired symbols. Ink droplets serving no function of printing are collected and returned to a nozzle after they impinge upon a screw as is well known in the art. In FIG. 1, the above mentioned ink droplets not assigned to the printing operation are the ink droplets 8, 9, 10, 11, 13, 14, 15, 16, 17, 19, 20, 21, 22, 23, 25, 26, 27 and 28.

Figure 2:
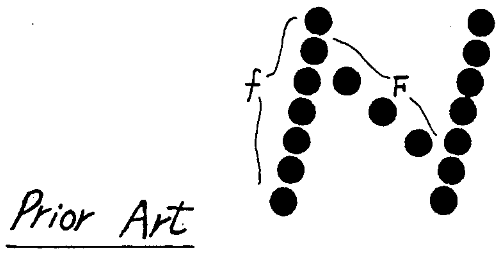
FIG. 2 is a schematic view showing a character pattern printed by an ink jet system printer of the prior art.

A typical configuration of a character "N" printed by an ink jet system printer of the prior art is shown in FIG. 2. The ink droplets deposited on a record receiving member are aligned along a line parallel to the diagonal in a portion F and, therefore, a distance between two adjacent ink droplets deposited on the record receiving member is longer as compared with that of a portion *f*. This results in the printed character not having a satisfactory print quality.

Figure 3:
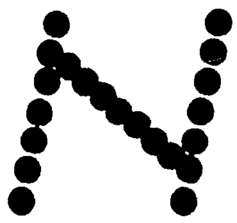
FIG. 3 is a schematic view showing a character pattern printed by a ink jet system printer of the present invention.

FIG. 3 shows a configuration of a character "N" printed by an ink jet system printer of the present invention. Interpolation dots are provided between two adjacent ink dots in the portion F. It will be clear from FIG. 1 that an interpolation dot *a'*, which corresponds to the ink droplet 9, is deposited between primary dots 6' and 12' on the record receiving member, another interporation dot *b'*, which corresponds to the ink droplet 15, is deposited between primary dots 12' and 18' on the record receiving member, still another interpolation dot *c'*, which corresponds to the ink droplet 21, is deposited between primary dots 18' and 24' and yet another interpolation dot *d'*, which corresponds to the ink droplet 27, is deposited between primary dots 24' and 30', respectively. The printing quality is greatly enhanced by provision of these interpolation dots.

It will be noted that these interpolation dots are provided by the use of the ink droplets serving no function of the primary dot matrix printing. Therefore, there is a possibility that the ink droplet to be used as the interpolation dot will be assigned to the primary dot for printing the primary dot matrix. In this case the following ink droplet in the formation timing will be used as the interpolation dot.

When the delayed (following) droplet is used as the interpolation dot, the resulting interpolation dot will be deposited on the record receiving member not at the desired point but at a point slightly shifted rightward. This shift can not be recognized by the operator and, therefore, the delayed interpolation dot is also effective to enhance the printing quality.

When both of the ink droplets to be assigned to the interpolation dot and the following one are assigned to the primary dot, no interpolation operations will be effected.

An embodiment of a control circuit suitable for providing the interpolation dots will be described with reference to FIGS. 4 through 11.

The control circuit comprises a read only memory 100 for providing a primary dot signal $P_1$ and an interpolation dot signal $P_2$ upon receiving a character selection signal S and a clock signal Cl, a logical circuit 110 for generating an interpolation signal EU, a delayed interpolation signal DEU and a dot signal DE in accordance with the output signals $P_1$ and $P_2$ from the read only memory 100, an instruction signal generator 120 for performing a level addition upon the interpolation signals in order to generate an instruction signal for instructing the interpolation operation, and a video signal generator 130 for generating a video signal in accordance with the output signals of the read only memory 100, the logical circuit 110 and the instruction signal generator 120.

Respective circuit constructions of the circuits 100, 110, 120 and 130 will be described in greater detail.

READ ONLY MEMORY 100

The read only memory 100 mainly comprises a main ROM 101, a sub ROM 102, a column counter 103, a row counter 104 and a decoder 105 as shown in FIG. 5.

The character selection signal S is introduced into the main ROM 101 and the sub ROM 102 as character addresses, whereas output signals of the column counter 103 are introduced into the main ROM 101 and the sub ROM 102 as column addresses. The main and sub ROM's 101 and 102 provide information corresponding to a particular column of a particular character in accordance with the input signals thereto.

Output signals from the row counter 104 are decoded at the decoder 105 and then applied to AND gates 106 and 107. Another input terminal of each of the AND gates 106 and 107 is adapted to receive the output signal of the main ROM 101 and the sub ROM 102, respectively, whereby the primary dot signal $P_1$ and the interpolation dot signal $P_2$ are generated from OR gates 108 and 109.

The primary dot signal $P_1$ bears a high level at atime when the ink droplet generated at a timing determined by the matrix counters 3, 4 is assigned to the primary matrix dot. In FIG. 1 the primary dots are numbered as 1' through 7', 12', 24' and 29' through 35'. The interpolation dot signal $P_2$ bears a high level at a time when the ink droplet is assigned to the interpolation dot. In FIG. 1 the interpolation dots are indicated as *a'*, *b'*, *c'* and *d'*.

LOGICAL CIRCUIT 110

The output signals $P_1$, $P_2$ from the OR gates 108 and 109 are introduced into the logical circuit 110, which generates the interpolation signal EU, the delayed interpolation signal DEU, and the dot signal DE as shown in FIG. 6.

The output signals $P_1$ and $P_2$ of the main ROM 101 and the sub ROM 102 are introduced into the logical circuit 110 via input terminals **111*a* and 111*b*, the respective wave forms being illustrated in ⓐ and ⓑ of FIG. 7. The clock signal CL, of which the wave form is shown in ⓗ of FIG. 7, is introduced into the T input terminal of a D-type flip-flop 112 via an input terminal 111*c* and an inverter 119**.

When both of the output signals $P_1$ and $P_2$ of the read only memory 100 are at the high levels, the D-type flip-flop 112 is set via an AND gate 113. The flip-flop 112 generates a high level signal after one clock period delay as shown in ⓒ and ⓓ of FIG. 7. When the output signal of the flip-flop 112 is at the high level, and both of the output signals $P_1$ and $P_2$ of main and sub ROM's 101 and 102 bear low levels, the delayed interpolation signal DEU is provided at an output terminal **116*a* via an DR gate 115 and an AND gate 114 as shown in ⓖ of FIG. 7**.

When the primary dot signal $P_1$ from the main ROM 101 is at the low level and the interpolation dot signal $P_2$ from the sub ROM 102 is at the high level, the interpolation signal EU is provided at an output terminal **116*c* via an AND gate 117 as shown in ⓕ of FIG. 7**.

When at least one of the primary dot signal $P_1$, the interpolation dot signal $P_2$ and the delayed interpolation signal DEU bears the high level, the dot signal DE is generated from an output terminal **116*b* via an OR gate 118 as shown in ⓘ of FIG. 7**.

Figure 8:
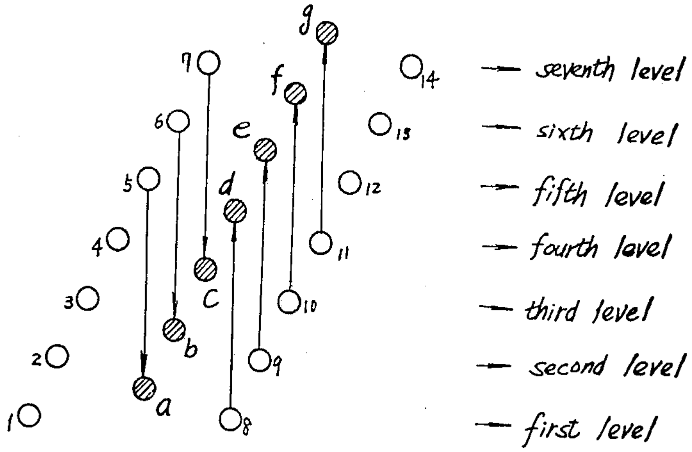
FIG. 8 is a schematic view showing a dot matrix pattern with interpolation dots of the present invention.

The interpolation technique will be more fully understood from the following description when considered with reference to FIG. 8.

The primary matrix dots 1 through 14 are provided when only the dot signal DE is generated. The interpolation dot a can be provided between the dots 1 and 9 or between the dots 2 and 8 at the timing for the dot 5. Therefore, the sub ROM 102 is so constructed that the address corresponding to the dot 5 is "1".

In the same way, the interpolation dots *b*, *c*, *d*, *e*, *f* and *g* are provided at the timing for the primary matrix dots 6, 7, 8, 9, 10 and 11, respectively.

When the ink droplets assigned to the first through fourth levels in the matrix pattern are used as the interpolation dots *d*, *e*, *f* and *g*, the respective ink droplets must be charged with charging signals higher than the normal ones by 3.5 levels. When the ink droplets assigned to the fifth through seventh levels in the matrix pattern are used as the interpolation dots *a*, *b*, and *c*, the respective ink droplets must be charged by charging signals lower than the normal ones by 3.5 levels.

The delayed interpolation technique will be described in detail with reference to FIG. 9.

When the ink droplet to be use as the interpolation dot is assigned to the primary dot for printing the primary dot matrix, the following ink droplet in the ink droplet formation timing is used as the delayed interpolation dot when the following one is not assigned to the primary matrix dot.

Figure 9:
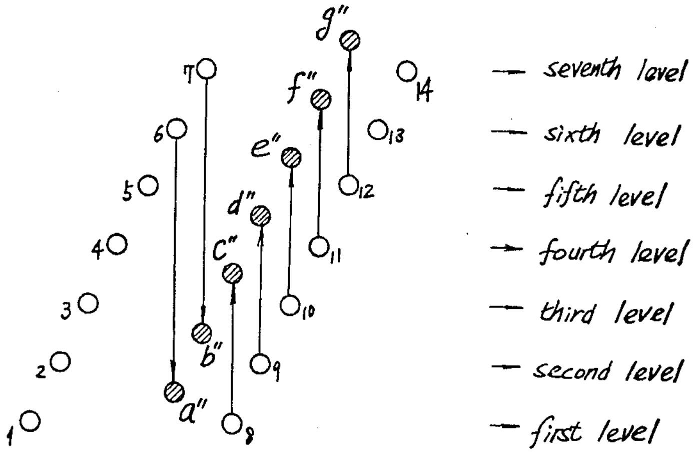
FIG. 9 is a schematic view showing a dot matrix pattern with delayed interpolation dots of the present invention.

Delayed interpolation dots *a"* through *g"* are provided at the timing for primary dots 6 through 12, respectively as shown in FIG. 9. When the ink droplets assigned to the first through fifth levels in the primary matrix pattern are used as the delayed interpolation dots $c''$ through $g''$, the respective ink droplets must be charged with charging signals higher than the normal ones by 2.5 levels. When the ink droplets assigned to the sixth and seventh levels in the primary dot matrix pattern are used as the delayed interpolation dots $a''$ and $b''$, the respective ink droplets must be charged with charging signals lower than the normal ones by 4.5 levels.

INSTRUCTION SIGNAL GENERATOR 120

FIG. 10 shows the instruction signal generator 120 which generates instruction signals for performing the above-mentioned level adding operation upon receiving the interpolation signal EU and the delayed interpolation signal DEU from the logical circuit 110.

A decoder 121 is connected to receive the output signals A, B and C from the row counter 104 in the read only memory 100 and then provides decoded signals to OR gates 122, 123, 124 and 125. Outputs of the OR gates 122 and 123 are applied to one input terminal each of AND gates 126 and 127, respectively, whereas the other input terminals of the AND gates 126 and 127 are connected to receive the interpolation signal EU. Outputs of the OR gates 124 and 125 are applied to one input terminal each of AND gates 128 and 129, respectively, whereas the other input terminals of the AND gates 128 and 129 are connected to receive the delayed interpolation signal DEU.

The AND gate 126 provides an instruction of +3.5 levels, the AND gate 127 provides an instruction of −3.5 levels, the AND gate 128 provides an instruction of +2.5 levels, and the AND gate 129 provides an instruction of −4.5 levels, respectively.

VIDEO SIGNAL GENERATOR 130

Referring now to FIG. 11, there is illustrated the video signal generator 130, the instruction of +3.5 levels is applied to the base electrode of a PNP transistor $Tr_1$ via an inverter 131. The instruction of +2.5 levels is applied to the base electrode of a PNP transistor $Tr_2$ via an inverter 132. The instructions of −3.5 levels and of −4.5 levels are applied to the base electrodes of NPN transistors $Tr_3$ and $Tr_4$ through Zener diodes 133 and 134, respectively.

The output signals A, B and C of the row counter 104 are applied to the base electrodes of PNP transistors $Tr_5$, $Tr_6$ and $Tr_7$ via inverters 135, 136 and 137, respectively.

The collectors of the respective transistors $Tr_1$ through $Tr_7$ are connected with the inverting input terminal of an operational amplifier $OP_1$ via resistors $R_1$ through $R_7$, of which the resistance values are determined to fulfill the following conditions:

$$R_1 : R_2 : R_3 : R_4 : R_5 : R_6 : R_7 = \frac{1}{3.5} : \frac{1}{2.5} : \frac{1}{3.5} : \frac{1}{4.5} : 1 : \frac{1}{2} : \frac{1}{4}$$

An output signal of the operational amplifier $OP_1$ is applied to the inverting input terminal of another operational amplifier $OP_2$ via a diode $D_1$ and a resistor $R_8$. The dot signal DE is applied to the base electrode of a transistor $Tr_8$ from the logical circuit 110. The collector of the transistor $Tr_8$ is connected with the inverting input terminal of the operational amplifier $OP_2$ via a diode $D_2$ and the resistor $R_8$. The connection point between the diode $D_2$ and the resistor $R_8$ is connected with a voltage source of −12V via a resistor $R_9$. The operational amplifier $OP_2$ provides a video output to be applied to the charging electrode in the ink jet system printer.

The transistors $Tr_1$ through $Tr_7$ are ON when the respective input signals bear the high levels, and the transistor $Tr_8$ is ON when the input signal bears the low level.

The outputs A, B and C of the row counter 104 are binary-coded signals and function to switch the conditions of the transistors $Tr_5$, $Tr_6$ and $Tr_7$. A composed current at a point $a$ in the video signal generator 130 is of a graded wave form since the resistance values of the resistors $R_5$, $R_6$ and $R_7$ are selected as 4:2:1 as described above. Level shift currents are added to the graded wave form current in accordance with the instructions of +3.5 levels, +2.5 levels, −3.5 levels and −4.5 levels and, thereafter, they are voltage converted at the operational amplifier $OP_1$.

When the dot signal DE applied to the transistor $Tr_8$ bears the high level, the voltage level at a point $b$ is −12V. Therefore, the diode $D_2$ is OFF and the output signal of the operational amplifier $OP_1$ is applied to the operational amplifier $OP_2$ via the diode $D_1$. At this time the operational amplifier $OP_2$ provides the video output.

When the dot signal DE applied to the transistor $Tr_8$ bears the low level, the point $b$ becomes 0 voltage level. The diode $D_2$ is ON and the diode $D_1$ is OFF and, therefore, the operational amplifier $OP_2$ does not receive the input signal.

The invention being thus described, it will be obvious that the same way be varied in many ways. Such variations are not to be regarded as a departure from the spirit and scope of the invention, and all such modifications are intended to be included within the scope of the following claims.

What is claimed is:

1. In an ink jet system printer of the charge amplitude controlling type which emits a stream of ink droplets of a uniform size from a nozzle toward a recording medium, selectively charges said ink droplets at a desired amplitude in accordance with a print information signal, deflects said charged ink droplets by deflection means, and prints desired symbols on said recording medium in a dot matrix pattern with said deflected ink droplets, said deflected ink droplets charged in accordance with said print information signal comprising primary matrix dots, the improvement comprising:

interpolation means for depositing interpolation ink droplets between adjacent primary matrix dots on the recording medium, said interpolation ink droplets having a same size as said deflected ink droplets comprising said primary matrix dots.

2. In an ink jet system printer of the charge amplitude controlling type which emits a stream of ink droplets of a uniform size from a nozzle toward a recording medium, selectively charges droplets assigned as primary matrix dots at a desired amplitude in accordance with a print information signal, deflects said charged ink droplets by deflection means, and prints desired symbols on said recording medium in a dot matrix pattern with said deflected ink droplets, the improvement comprising:

interpolation means for depositing interpolation ink droplets not assigned to primary matrix dots between adjacent primary matrix dots on the recording medium, size interpolation ink droplets having a same size as said deflected ink droplets comprising said primary matrix dots.

3. In an ink jet system printer of the charge amplitude controlling type which emits a stream of ink droplets of a uniform size from a nozzle toward a recording medium, selectively charges droplets assigned as primary matrix dots at a desired amplitude in accordance with a print information signal, deflects said charged ink droplets by deflection means, and prints desired symbols on said recording medium in a dot matrix pattern with said deflected ink droplets, the improvement comprising:

means for generating an interpolation signal to be applied to a said ink droplet not assigned as a said primary matrix dot for depositing the ink droplets charged by the said interpolation signal between obliquely adjacent primary dots on said recording medium.

4. In an ink jet system printer of the charge amplitude controlling type which emits a stream of ink droplets of a uniform size from a nozzle toward a recording medium, selectively charges droplets assigned as primary matrix dots at a desired amplitude in accordance with a print information signal, deflects said charged ink droplets by deflection means, and prints desired symbols on said recording medium in a dot matrix pattern with said deflected ink droplets, the improvement comprising:

means for developing a primary dot signal in accordance with the print information signal; means for developing an interpolation dot signal in accordance with the print information signal; means for generating a video signal for charging the ink droplets in accordance with the primary dot signal and the interpolation dot signal; and means for modifying the video signal level in accordance with the interpolation dot signal, whereby a said ink droplet charged by the said video associated with the said interpolation dot signal is positioned between obliquely adjacent matrix dots charged by the said video signal associated with the said primary dot signal on the said recording medium.

5. In an ink jet system printer of the charge amplitude controlling type which emits a stream of ink droplets from a nozzle toward a recording medium, selectively charges said ink droplets at a desired amplitude in accordance with a print information signal, deflects said charged ink droplets by deflection means, and prints desired symbols on said recording medium in a dot matrix pattern with said deflected ink droplets, said deflected ink droplets charged in accordance with said print information signal comprising primary matrix dots, said primary dots being selected from a maximum number of available ink droplets for defining said dot matrix and being spaced apart on said medium in keeping with said matrix pattern and defining said symbols with greater spacing in those portions of said symbols oblique to said matrix pattern, the improvement comprising:

means responsive to those print information signals defining characters with oblique portions for inserting interpolation dots between said adjacent primary dots on said printing medium in said oblique portions to reduce said greater spacing therebetween;

said interpolation dots being obtained from those maximum available droplets not selected as primary dots in said matrix pattern.

6. The ink jet system printer of claim 5 wherein said ink droplets comprising said dots are substantially uniform in size.

* * * * *